March 6, 1934. E. R. SMITH ET AL 1,950,039
TOOL SLIDE POSITIONING MECHANISM
Filed Sept. 21, 1931 4 Sheets-Sheet 1
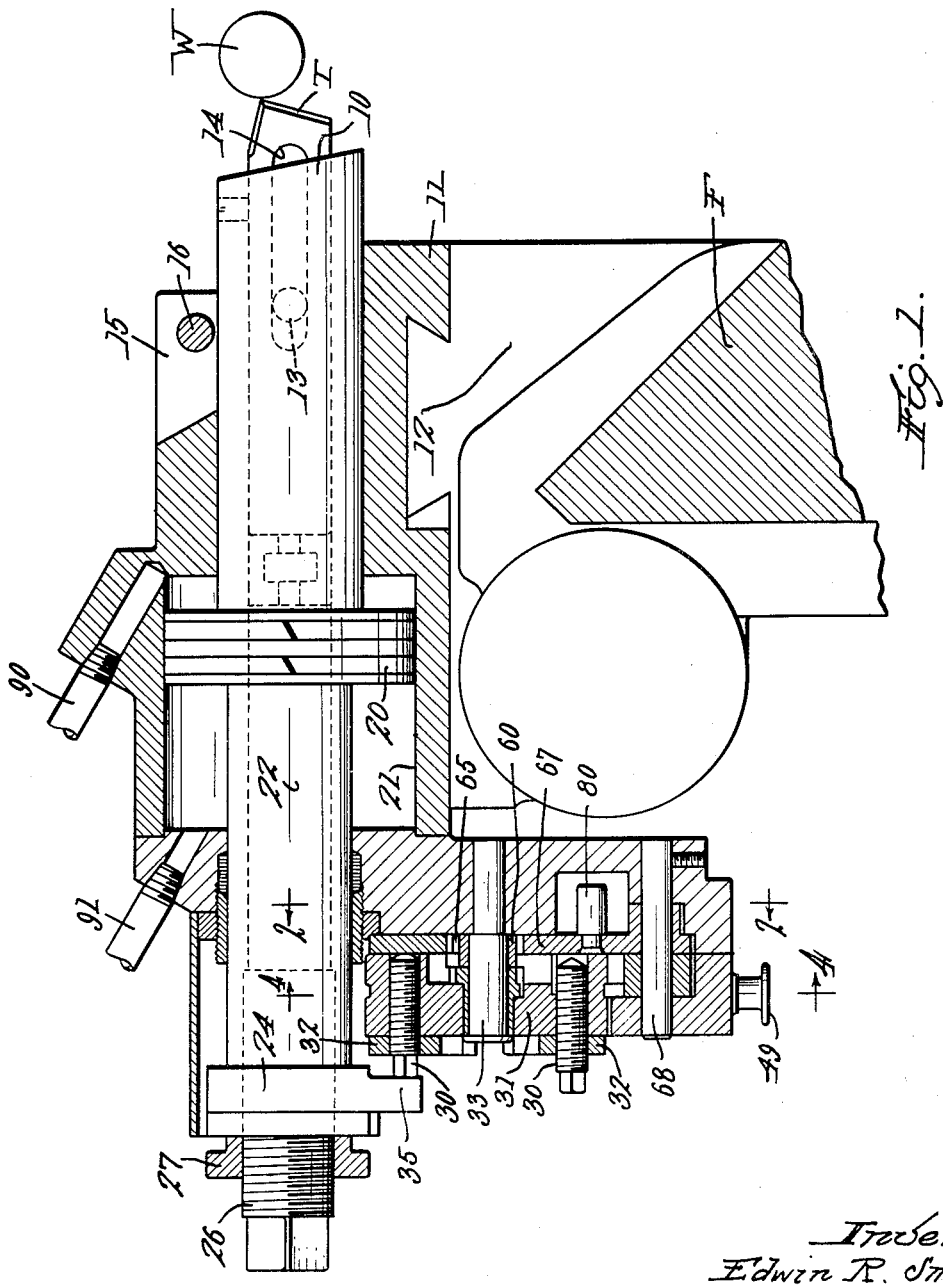
Inventors
Edwin R. Smith
Albert Schinke
By Attorneys
Southgate Fay & Hawley March 6, 1934. E. R. SMITH ET AL 1,950,039
TOOL SLIDE POSITIONING MECHANISM
Filed Sept. 21, 1931 4 Sheets-Sheet 2
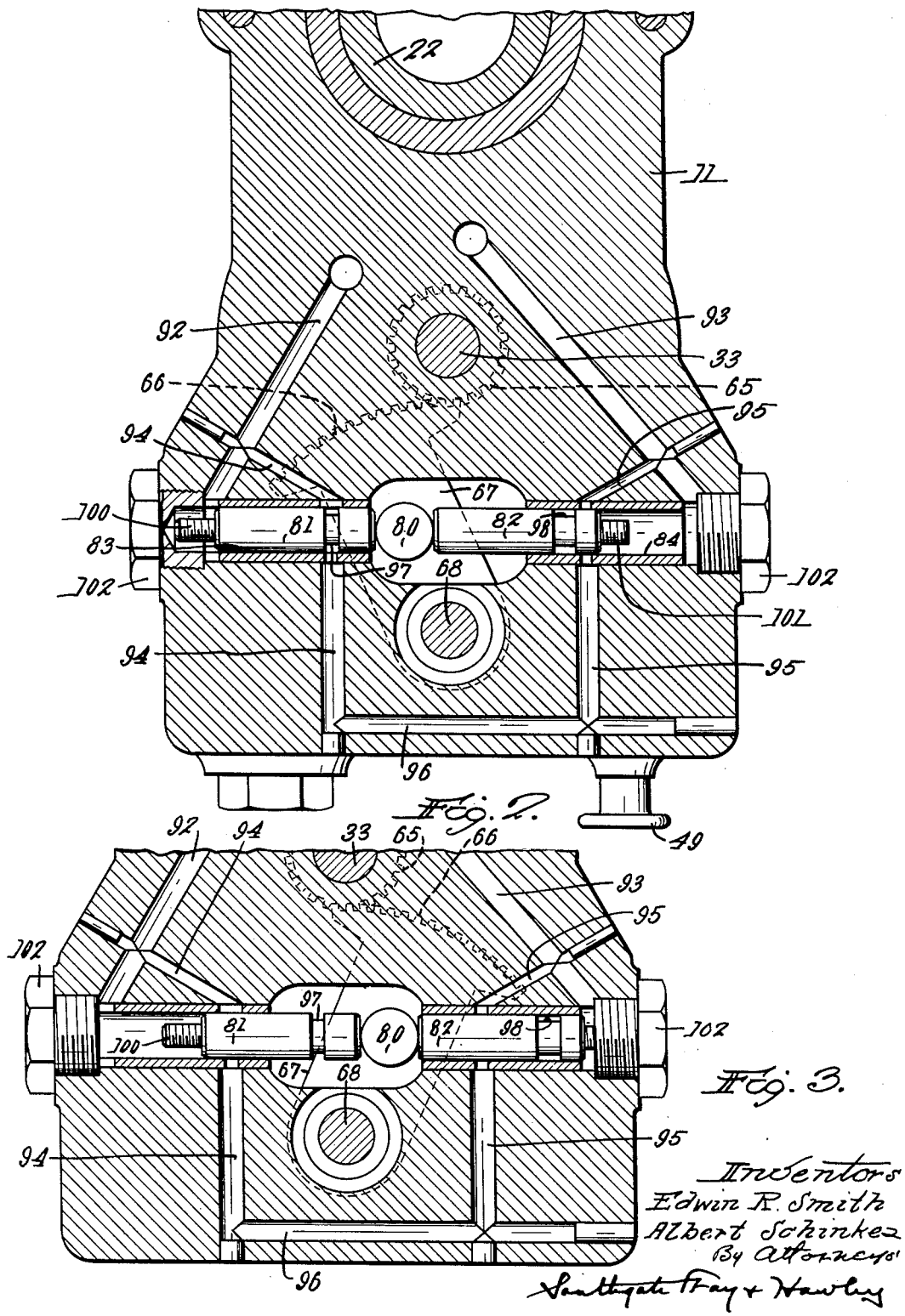

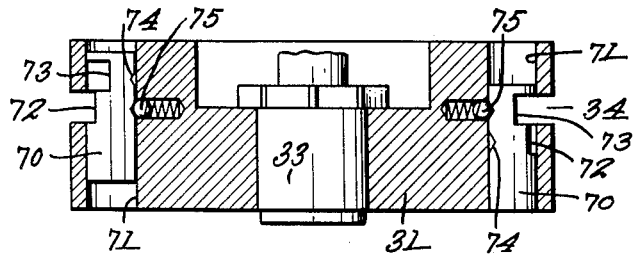
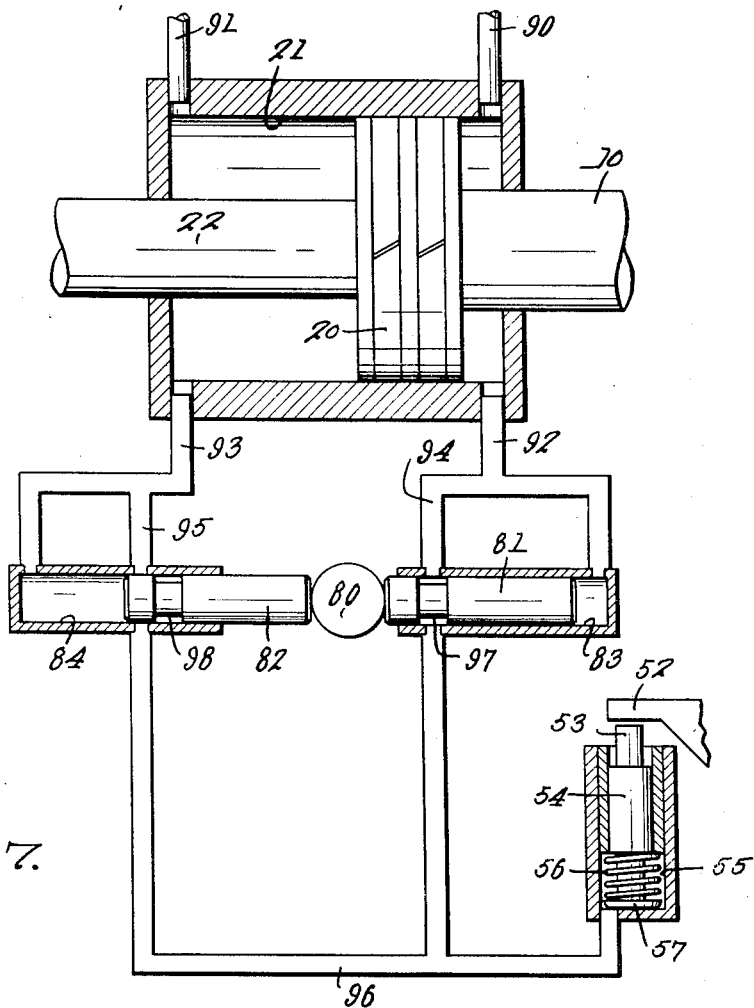

Patented Mar. 6, 1934

1,950,039

UNITED STATES PATENT OFFICE 1,950,039

TOOL SLIDE POSITIONING MECHANISM

Edwin R. Smith and Albert Schinkez, Seneca Falls, N. Y., assignors to Seneca Falls Machine Company, Seneca Falls, N. Y., a corporation of Massachusetts Application September 21, 1931, Serial No. 563,970

9 Claims. (Cl. 82—25)

This invention relates to machine tools in which a tool slide or other member is to be moved to a plurality of predetermined operative positions.

It is the general object of our invention to provide improved means for variably limiting the advance movement of a movable member, such as a tool slide.

A further object is to provide means by which a plurality of successive and different limits may be selectively established in predetermined order.

In the preferred form, we also provide automatic means for advancing the limiting means or stops to successive positions, thereby automatically determining successive operative positions of the tool slide or other member.

While capable of general application, our invention is particularly designed for locating a tool slide in an automatic lathe in a series of successive different positions with respect to the work.

Our invention further relates to arrangements and combinations of parts which will be hereinafter described and more particularly pointed out in the appended claims.

A preferred form of the invention is shown in the drawings, in which

Fig. 1 is a sectional side elevation of our improved positioning mechanism, mounted on a machine tool frame;

Fig. 2 is a sectional rear elevation, taken along the line 2—2 in Fig. 1;

Fig. 3 is a sectional view similar to Fig. 2 but showing certain parts in a different position;

Fig. 6 is a detail sectional plan view, taken along the line 6—6 in Fig. 4, and

Fig. 7 is a diagrammatical view showing the hydraulic connections for the various operating devices.

Figure 4:
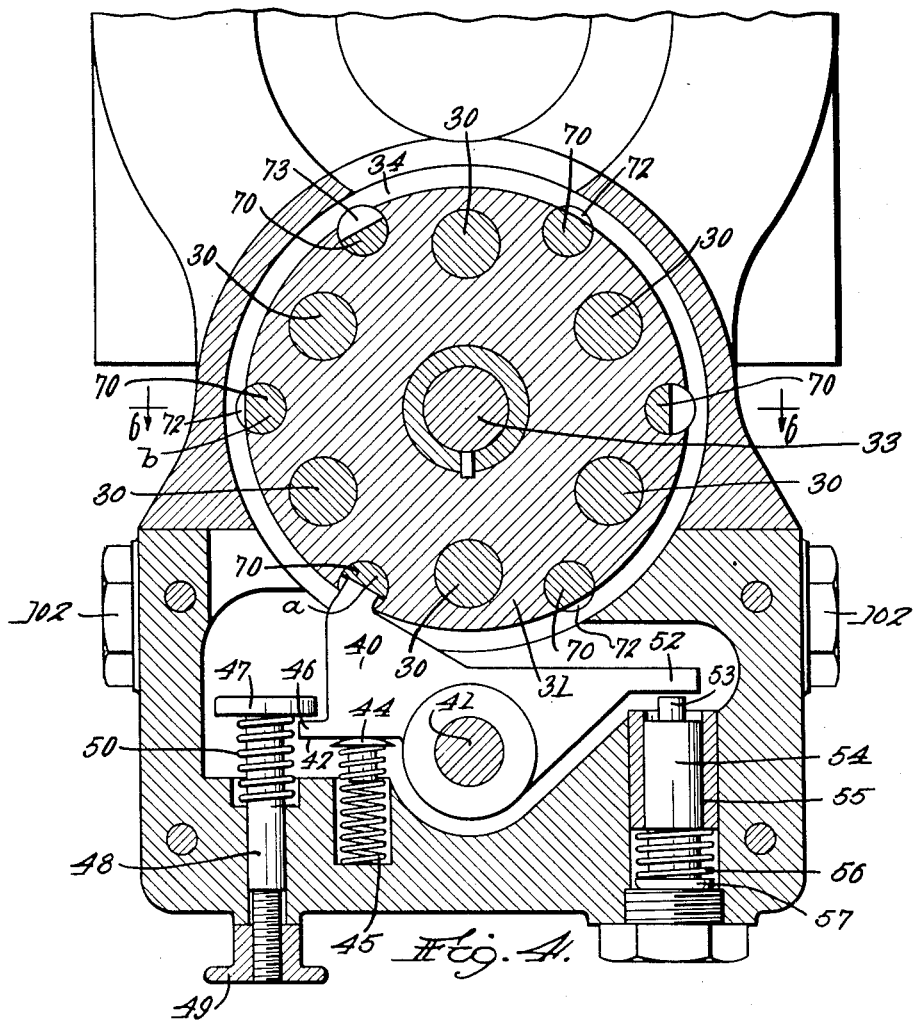
Fig. 4 is a sectional front elevation, taken along the line 4—4 in Fig. 1.

Referring to Fig. 1, we have shown a tool T positioned to engage a piece of work W and mounted in a tool slide 10. The slide 10 is mounted in a tool carriage 11, adjustable lengthwise of a support 12 which in turn is mounted on a guide-way formed on the frame F of the machine. A stud 13 (Fig. 1) projects into a longitudinal groove or recess 14 in the side of the tool holder 10 and prevents angular movement thereof.

The outer portion of the tool slide bearing in the carriage 11 may be split, as indicated at 15 in Fig. 1, and may be provided with a clamping bolt 16 by which it may be adjusted to provide any desired frictional resistance to the movement of the slide 10 or to lock the slide in fixed position when work of uniform diameter throughout is to be produced.

At its forward end, the tool slide 10 is connected to a piston 20, slidable in a cylinder 21 in the tool carriage 11. A piston rod 22 for the piston 20 extends forward through a suitable stuffing box and is provided with a stop collar 24.

Preferably the tool slide 10, piston 20 and piston rod 22 form a single integral structure, in which the tool T may be adjusted lengthwise by a screw-threaded rod 26 and lock nut 27. The rod 26 is threaded into an opening in the piston rod 22 and is provided with a swivel connection to the inner end of the tool T.

A plurality of stop screws 30 are mounted in an index plate or disc 31 and may be secured in adjusted position by lock nuts 32. The disk 31 is fixed on a short shaft 33 having a bearing in the carriage 11 and is provided with a series of index notches 34 by which each stop screw may be positioned in alignment with an off-set lug 35 of the stop collar 24 previously described.

A locking pawl 40 (Fig. 4) is mounted on a fixed pivot 41 and is normally seated in one of the notches 34. A shoulder 42 of the pawl 40 is engaged by a plunger 44, pressed yieldingly against the pawl by a spring 45.

A lug 46 on the pawl 40 may be engaged by the head 47 of a stud 48, extending downward through the carriage 11 and provided with a knob 49 and spring 50. This stud 48 may be used for manually releasing the pawl 40 whenever desired.

The pawl 40 may also be released automatically, and for this purpose the pawl is provided with an outwardly extending arm 52, engaged by the end portion 53 of a small piston 54, slidable in a bushing in a cylinder or recess 55 in the carriage 11. This piston 54 is normally moved downward by a spring 56 which engages a head 57 on the lower end of the plunger or piston. The connections for operating the piston 54 will be hereinafter described.

The index plate or disc 31 may be arranged for any desired number of index screws but is shown in Fig. 4 as provided with six index screws 30 and with six corresponding index notches 34.

Figure 5:
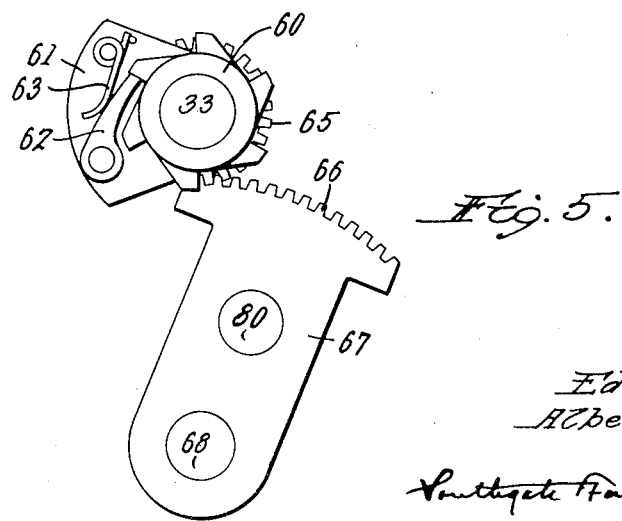
Fig. 5 is a front elevation of the index-feeding mechanism.

The mechanism for feeding the index disc comprises a six-tooth ratchet member 60 (Fig. 5) secured to the shaft 33 to which the index plate 31 is also secured. A pawl support 61 is loosely mounted on the shaft 33 and supports a pawl 62, yieldingly held in position to engage the teeth of the ratchet member 60 by a spring 63. The pawl plate 61 is also provided with gear teeth 65, engaged by gear teeth 66 on a segment arm 67 mounted on a fixed pivot 68.

As the segment gear is rocked by the hydraulic mechanism to be described, the pawl 62 will be advanced to rotate the shaft 33 and disk 31 through a half revolution, or through a less angular movement if the locking pawl 40 engages a notch 34 before the disk has been turned a half revolution.

We have provided convenient means for blocking off any of the notches 34 corresponding to positions not required by a particular set-up of the machine. For this purpose studs 70 (Fig. 6) are mounted in transverse openings 71 adjacent to the notches 34. Each stud 70 is provided with a shallow recess 72 and with a deeper recess 73 and is also provided with indentations 74 to be engaged by a spring-pressed ball 75, by which each stud may be held yieldingly in fixed position, with a selected recess 72 or 73 in alignment with the notch 34.

If a deeper recess 73 is aligned with a notch 34, as indicated at $a$ in Fig. 4, the pawl 40 can enter the notch 34 and thus lock the disk 31. If, however, a shallow recess 72 is aligned with a notch 34 as indicated at $b$ in Fig. 4, the surface 72 will be continuous with the outer surface of the disk, so that the pawl 40 will slide freely thereover.

By thus adjusting the studs 70 endwise in the disk 31, any selected notches 34 may be rendered operative and the remaining notches may be rendered inoperative.

For swinging the segment arm 67, we provide a stud 80 in the segment arm, extending rearward and positioned between plungers 81 and 82 (Fig. 2) slidable in bushings in cylinders 83 and 84. When one of these plungers is rendered operative, the stud 80 and arm segment 67 is moved in one direction and when the other plunger is rendered operative, the parts are returned to initial position.

The operation of the hydraulic mechanism is most easily understood by reference to Fig. 7, in which the relation of the parts is shown diagrammatically.

Supply pipes 90 and 91 are connected to the opposite ends of the main cylinder 21 and pipes 92 and 93 connect the corresponding ends of the main cylinder to the outer ends of the cylinders 83 and 84, while branch pipes 94 and 95 are connected to a pipe 96 which leads to the lower end of the cylinder 55. The piston 81 is provided with an annular groove or recess 97 and the piston 82 is similarly provided with an annular recess 98.

Assuming that the tool T has been advanced to working position and that the operation on the work has been completed, pressure will be admitted through the pipe 90 to the right-hand end of the cylinder 21, as viewed in Fig. 7, and the pipe 91 will be connected to the exhaust or storage. At the same time, pressure will be admitted through pipe 92 to the outer end of the cylinder 83 and also to the branch pipe 94.

At this time the annular recess 97 is in alignment with the pipe 94, so that pressure will be transmitted through the pipe 94 to the pipe 96 and thence to the cylinder 55, raising the plunger 54 and withdrawing the pawl 40 from locking position. At the same time the pipe 93 and branch pipe 95 are connected to the exhaust, but the branch pipe 95 is blocked off by the piston 82.

The piston 20 continues its movement to the left, and as soon as the pawl 40 is withdrawn, the piston 81 begins to effect an operating feeding movement of the stud 80 and segment arm 67. As soon as this movement begins, the annular recess 97 passes out of alignment with the branch pipe 94, consequently blocking off the pressure supply to the cylinder 55. At the same time, the piston 82 is moved to bring the recess 98 into alignment with the branch pipe 95, thus momentarily connecting the cylinder 55 to the exhaust, whereupon the spring 56 withdraws the plunger 54 and allowing the pawl 40 to be rendered yieldingly operative by the spring plunger 44.

The movement of the stud 80 and segment arm 67 and the angular movement of the disk 31 continues until an open notch in the disk is aligned with the pawl 40, which may be after one-sixth of a revolution, one-third of a revolution, or one-half of a revolution, with the disk and stops arranged as shown in the drawings.

Stop screws 100 and 101 (Fig. 2) are provided in the pistons 81 and 82 to limit the respective outward movement thereof by engagement with cap screws 102.

After the tool has been withdrawn and the operations of the feeding mechanism have taken place, a reversing valve mechanism (not shown) shifts the connections of the pipes 90 and 91, so that pressure is now admitted through the pipe 91 to advance the tool T to a new operative position, determined by the newly positioned stop screw 30.

The position of the parts at the beginning of the return movement is as indicated in Fig. 3, and the operation of the parts during the return or idle movement of the segment arm 67 will be readily understood.

We have thus provided means for hydraulically advancing a tool slide or other member to a series of operative positions, each selectively determined by one of a series of stop members, and we have provided automatic means for successively bringing these stop members into working position. The mechanism is simple and reliable in operation and is particularly well adapted for the intended purposes. It will be understood that the term "hydraulic mechanism" is intended to include any fluid-operated mechanism.

Having thus described our invention and the advantages thereof, we do not wish to be limited to the details herein disclosed, otherwise than as set forth in the claims, but what we claim is:—

1. In a lathe, a tool slide, means to advance and withdraw said tool slide, a rotatable support, a plurality of stops mounted in an annular series in said support, a fixed stop element coordinating therewith, means to turn said support when said tool slide is withdrawn, and means to variably determine the number of stops on said support which are moved into successive alignment with said fixed stop at each operation of said turning means.

2. In a lathe, a tool slide, means to advance and withdraw said tool slide, a rotatable support, a plurality of stops mounted in an annular series in said support, said support having a notch corresponding to each stop, a locking pawl having an end portion positively locking said rotatable support when entered in one of said notches, means to block off selected notches, fluid-operated automatic means to withdraw said locking pawl as the tool slide is withdrawn, and means to thereafter advance said stop support angularly until an open notch is presented in alignment with the end portion of said locking pawl.

3. In a lathe, a tool slide, means to advance and withdraw said tool slide, a rotatable support, a plurality of stops mounted in an annular series in said support, said support having a notch corresponding to each stop, a locking pawl having an end portion positively locking said rotatable support when entered in one of said notches, automatic means to withdraw said pawl as the tool slide is withdrawn, means to feed said support angularly until a notch is presented in alignment with said end portion, selected stops being removable from said support, and means to block off the corresponding notches in said support.

4. In a lathe, a tool slide, means to advance and withdraw said tool slide, a rotatable support, a plurality of stops mounted in an annular series in said support, said support having a notch corresponding to each stop, a locking pawl having an end portion positively locking said rotatable support when entered in one of said notches, automatic means to withdraw said pawl as the tool slide is withdrawn, means to feed said support angularly until a notch is presented in alignment with said end portion, studs mounted in said support and having recessed portions, and means to hold each stud with different selected portions opposite its notch, whereby each notch may be rendered operative or inoperative by selective positioning of its associated stud.

5. In a machine tool, a movable member, fluid-operated means to move said member toward and away from the work, an automatic indexing device having a plurality of operative positions and effective in each position to establish a predetermined limit of advance movement of said member, fluid-operated automatic means to move said device to successive operative positions, and fluid connections by which said first fluid-operated means is effective to control and coordinate the operation of said second fluid-operated means.

6. The combination in a machine tool as set forth in claim 5, in which a locking device is provided for said rotatable support, and fluid-operated unlocking means for said locking device, said unlocking means having fluid-connection with said previously mentioned fluid-operated means and being coordinating in its movements therewith.

7. The combination in a machine tool as set forth in claim 5, in which said member-moving means comprises a main cylinder and piston and in which said index-actuating means comprises a feeding element, a pair of pistons oppositely engaging said element, cylinders for said pistons, fluid connections from each of said two cylinders to the ends of said main cylinder respectively, through which connections the movements of all of said pistons are coordinated.

8. In a machine tool, tool-feeding means, a plurality of stops, stop-feeding means, unlocking means for said stops, separate fluid-operated actuating devices for each of said means, fluid connections between the actuating devices for said tool feeding means and said stop feeding means, and branch connections from said fluid connections to the actuating device for said unlocking means.

9. In a machine tool, tool-feeding means, a plurality of stops, stop-feeding means, unlocking means for said stops, separate fluid-operated actuating devices for each of said means, fluid connections between the actuating devices for said tool feeding means and said stop feeding means, and branch connections from said fluid connections to the actuating device for said unlocking means, said branch connections being controlled by the actuating devices for the stop feeding means.

EDWIN R. SMITH.
ALBERT SCHINKEZ.